United States Patent [19]

Cohen

[11] 4,346,202

[45] Aug. 24, 1982

[54] SHORTSTOPPING FREE RADICAL POLYMERIZATION OF OLEFINIC MONOMERS

[75] Inventor: Louis Cohen, Avon Lake, Ohio

[73] Assignee: The B. F. Goodrich Company, Akron, Ohio

[21] Appl. No.: 257,284

[22] Filed: Apr. 24, 1981

[51] Int. Cl.$^3$ .............................. C08F 2/42; C08F 2/20
[52] U.S. Cl. ....................................... 526/83; 526/84; 526/85; 526/202
[58] Field of Search ..................... 526/211, 82, 83, 84, 526/85

[56] References Cited

U.S. PATENT DOCUMENTS 3,225,108 12/1965 Sturgis ................................. 526/212
3,862,066 1/1975 Reiter ................................... 526/84
4,283,514 8/1981 Weimer ................................ 526/84

Primary Examiner—Christopher A. Henderson, Jr.
Attorney, Agent, or Firm—Joe A. Powell; A. A. Csontos

[57] ABSTRACT

The present invention relates to the polymerization of vinyl monomers either alone or copolymerized with ethylenically unsaturated polymerizable monomers having a terminal $CH_2\!\!=\!\!C\!<$ grouping using a free-radical yielding catalyst or catalyst system, wherein the polymerization reaction is effectively stopped by the addition to the reaction mixture of a shortstopping agent, such as, for example, 4,4'-thiodiphenol (TDP).

11 Claims, No Drawings

SHORTSTOPPING FREE RADICAL POLYMERIZATION OF OLEFINIC MONOMERS

BACKGROUND OF THE INVENTION

In the polymerization of olefinic monomers having a terminal $CH_2=C<$ grouping with free radical catalysts, particularly those containing oxygen, it is generally necessary to stop the reaction after the polymerization has reached a predetermined state in order to obtain stable, uniform polymers. Also, in many polymerization systems, it is often desirable to stop the polymerization reaction short of complete conversion so that an effective agent of some kind must be employed to stop the reaction quickly without adversely affecting the polymerization product. The problem is particularly acute when employing the more active catalysts that give extremely fast polymerization rates and with, for example vinyl chloride polymers that are subject to thermal degradation.

In the manufacture of homopolymers and copolymers of olefinic monomers, and particularly from vinyl halides and vinylidene halides, one of the most important aspects is reaction control during the entire course of the polymerization. This is related, directly or indirectly, to such things as demands on heat exchange equipment, "run-away" reactions, formation of off-specification products, and the like. Accordingly, some means to terminate a polymerization, such as this, at any given time would be most desirable.

Heretofore, various shortstepping agents have been employed to terminate the polymerization of monoolefinically unsaturated monomers. However, many of these shortstopping agents do not work fast enough. Further, many of these shortstopping agents have been found to be ineffective in completely halting the polymerization or have been found to be effective only in such concentrations as result in discoloration of the polymer product. Therefore, there is a need for a shortstepping agent which overcomes the aforementioned difficulties.

SUMMARY OF THE INVENTION

It has been found that in the polymerization of vinyl monomers, either alone, or copolymerized with monomers having a terminal $CH_2=C<$ grouping, with a catalyst or catalyst system, the polymerization reaction is effectively slowed down and stopped by the addition to the reaction mixture of 4,4'-thiodiphenol (TDP) or a salt of thiodiphenol, such as, for example, the monoethanolamine salt thereof.

DETAILED DESCRIPTION

While the process of the present invention is applicable to any polymerization system normally employed to polymerize olefinic monomers wherein a free radical yielding catalyst is used, such as bulk, solution, aqueous suspension, aqueous emulsion, batch or continuous, and the like, for simplicity of description the invention will be described as it is applicable to an aqueous suspension polymerization system. It is understood, however, that this is merely intended in an illustrative sense.

The monomers which may be employed in the present invention include vinyl chloride and polymerizable olefinic monomers copolymerizable therewith having at least one terminal $CH_2=C<$ grouping such as the other vinyl halides and vinylidene halides, for example, vinyl bromide, vinylidene chloride, etc.; acrylic acid; esters of acrylic acid, such as methyl acrylate, ethyl acrylate, butyl acrylate, octyl acrylate, cyanoethyl acrylate, and the like; methacrylic acid; esters of methacrylic acid, such as methyl methacrylate, butyl methacrylate, and the like; nitriles, such as acrylonitrile, methacrylonitrile, etc; acrylamides, such as methyl acrylamide, N-methylol acrylamide, N-butoxy methacrylamide, and the like; vinyl ethers, such as ethyl vinyl ether, chloroethyl vinyl ether, and the like; the vinyl ketones, such as methyl vinyl ketone, etc.; vinyl naphthalene; allyl and vinyl chloroacetate; vinyl acetate; vinyl pyridine; and mixtures of any of these types of monomers and other olefinic monomers copolyermizable therewith including esters of maleic and fumaric acid, and the like; and other copolymerizable olefinic monomers of the types known to those skilled in the art. The present invention is particularly applicable to the polymerization of vinyl chloride, either alone, or in admixture with one or more other polymerizable olefinic monomers having at least one terminal $CH_2=C<$ grouping in amounts up to about 49% by weight of comonomer, based on the weight of the monomer mixture.

Among the catalysts or initiators that may be employed in the present process are the free radical yielding catalysts or initiators, such as the alkanoyl, aroyl, alkaroyl and aralkanoyl diperoxides and monohydroperoxides, azo compounds, peroxyesters, percarbonates, and the like. As examples of such catalysts, there may be named benzoyl diperoxide, lauryl diperoxide, diacetyl peroxide, cumene hydroperoxides, hydrogen peroxide, methyl ethyl ketone peroxide, diisopropylbenzene hydroperoxide, 2,4-dichlorobenzoyl peroxide, benzoyl peroxide, naphthoyl peroxide, lauroyl peroxide, acetyl cyclohexane sulfonyl peroxide, t-butyl perbenzoate, di-t-butyl perphthalate, diisopropyl peroxydicarbonate, di(sec-butyl)peroxydicarbonate, and the like, azo-bisisobutyronitrile, $\alpha,\alpha'$-azodiisobutyrate, and the like, etc. The choice of any particular free radical yielding catalyst is dictated in part by the particular monomer or monomers to be polymerized and by the color requirements of the polymer or copolymer to be produced. Further, more than one catalyst may be employed in the polymerization recipe. Usually, the amount of catalyst or catalysts employed will be in the range of about 0.005% to about 1% by weight, based on the weight of the monomer or monomers being polymerized. Preferably, the amount of catalyst(s) will be in the range of about 0.02% to about 0.10% by weight.

The shortstopping agents used in the process of the present invention are 4,4'-thiodiphenol (TDP), the $NH_4$, Na, K or Li salts of TDP, the acid forms or said salt forms of various mixtures of the 4,4'-, 2,2'-, and 2,4'-TDP isomers, monoethanolamine salt of TDP, and the like. The salts can be added to the reaction mixture as a water solution which makes for ease of handling. A unique feature of the salts of TDP is that they may be added to the reaction medium at any time and the shortstopping property of the same will be delayed so long as the pH of the reaction medium is kept above 7.0. This can be accomplished by the use of a buffer. The shortstopping property can then be activated or triggered when desired by lowering the pH to about 2.0 to 5.0 by the addition of a suitable acid, such as hydrochloric acid, to the polymerization medium.

The amount of the shortstopping agent normally employed to stop a polymerizable reaction will be greater than ½ the amount of the catalyst(s) charged to the reactor, usually as a molar amount about equivalent to the catalyst(s) remaining in the polymerization mixture at the time of the shortstop. Usually about 0.02 part by weight, based on 100 weight parts of monomer(s), up to an excess of that required to stop the polymerization reaction, which is readily determinable by those skilled in the art, is employed. A substantial excess of shortstopping agent is normally not necessary, but if more than the normal amount is accidently added, it will do no harm since it is not necessary to remove the shortstopping agent from the resin or polymer.

While the shortstopping agent may be added to the reaction mixture as such, it is preferred to add the same in an alcoholic or aqueous solution. In the case of TDP, an alcohol, such as methanol, ethanol, isopropanol, and the like, is employed. A concentration of TDP in alcohol in the range of about 1% to about 30% by weight is satisfactory. In the case of the monoethanolamine and other salts of TDP, an aqueous solution is used at a concentration in the same range as above. The advantage of employing a solution of the shortstopping agent is the ease and safety of handling. Further, TDP is a pure, colorless, low toxicity material, as are the salts, which reduces the hazard of discoloration of the polymer produced.

When polymerizing olefinic monomers by the suspension polymerization technique, it is advantageous, although not essential, to add to the liquid reaction medium a small amount of a dispersant. The purpose of the dispersant is to obtain a more complete and uniform dispersal of the monomer(s) and catalyst(s) throughout the reaction medium prior to and during the polymerization of the monomer(s). Any of the well known dispersants operative in aqueous media may be employed. These include, among others, methyl cellulose, hydroxypropyl methyl cellulose, polyvinyl alcohol, dodecylamine hydrochloride, sodium lauryl sulfonate, lauryl alcohol, sorbitan monolaurate polyoxyethylene, nonylphenoxy polyoxyethylene ethanol, hydrolyzed polyvinyl acetates, etc. The amount of dispersant employed will be in the range of about 0.01% to about 1.0% by weight, based on the weight of the monomer(s), to give satisfactory results. Preferably, however, the dispersant is employed in the range of about 0.02% to about 0.10% by weight.

In aqueous suspension polymerization the reaction is usually conducted at a temperature in the range of about 0° C. to about 100° C. depending upon the particular monomer or monomers being polymerized. It is preferred, however, to employ temperatures in the range of about 40° C. to about 70° C., since, at these temperatures, polymers having the most all around beneficial properties are produced. This is particularly so in the case of making homopolymers and copolymers of vinyl chloride. The time of the reaction will vary from about 2 to about 15 hours. However, with the shortstopping agents of the present invention the reaction can be slowed down and stopped at any convenient point, such as just before the reaction "tailpeaks", that is, when the temperature of the reaction rises significantly above its set point. Also, runaway reactions can be avoided with the shortstopping agents of the present invention.

The suspension polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

Further, the suspension polymerization process may be carried out utilizing a full reactor technique. That is, the reaction vessel is filled to a predetermined level with the polymerization medium and kept that way during the course of the reaction cycle by constant addition thereto of water, or additional makeup liquid containing the monomer or monomers in the same proportion as at startup. When the desired conversion of monomer(s) to polymer is reached, which can be predetermined from the amount of liquid added to the reaction mixture, the reaction is terminated by the addition of the present shortstopping agents. The necessity for the addition of liquid is due to the shrinkage in volume of the reaction medium produced by the conversion of the monomer(s) to the polymeric state.

The following specific examples are given by way of illustration of the invention and are not intended to be limitative. In the examples, all parts and percentages are by weight unless otherwise indicated.

EXAMPLE I

In this example, several runs were made using different shortstopping agents of the invention and a control with no shortstop. In addition, for purposes of comparison, a well known shortstop was used, namely, bisphenol A (BPA), as well as the sodium salt thereof. The polymerization recipe employed in each run was as follows:

| Ingredient | Parts |
|---|---|
| Vinyl Chloride | 100 |
| Water (demineralized) | 165 |
| Polyvinyl alcohol (88% hydrolyzed PVA) | 0.04 |
| Di (secondary butyl) peroxydicarbonate | 0.03 |

Each run was made in a 3 liter stainless steel reactor equipped with a stirrer. A full reactor technique was employed in each run, that is, water was added to the reaction mixture to maintain a constant level and compensate for shrinkage due to formation of polymer. The polymerization was run at 56° C. until about 300 ml. water had been added which took about 200 minutes (3.33 hours), or about 55% conversion of monomer to polymer. At this point the shortstop was injected and polymerization continued for about 60-70 minutes longer while carefully measuring the water added to maintain the level. From the amount of water added after injection of the shortstop, the further % conversion was calculated. The porosity of each polymer was measured since the porosity decreased with higher conversion. The porosity was determined by the use of a standard mercury porosimeter. The pertinent data with respect to each run is given in the following table:

TABLE I

| Run No. | Shortstop Type | Molar Ratio Shortstop/ Initiator | Ml.H₂O Added After Shortstop Injection | Equiv. % Conversion After Shortstop | Final % Conversion | Porosity cc./gm. |
|---|---|---|---|---|---|---|
| 1 (Control) | None | 0 | 140 | 25.4 | 81.0 | 0.06-0.10 |
| 2 | BPA(bisphenol A)[1] | 0.97 | 3.5 | 6.4 | 69.0 | 0.08 |
| 3 | TDP(4,4'-thio-diphenol)[1] | 0.93 | 29 | 5.3 | 61.9 | 0.18 |
| 4 | Na—BPA[2] | 0.97 | 60 | 10.9 | 69.3 | 0.10 |
| 5 | Na—TDP[2] | 0.93 | 97 | 17.6 | 75.6 | 0.06 |
| 6 | MEA—TDP[2] [3] | 0.93 | 41 | 7.5 | 62.0 | 0.19 |

[1]Added as 10% solution in methanol.
[2]Added as 10% solution in water.
[3]Mono—ethanolamine salt of 4,4'-thiodiphenol.

The above results show the advantage of the shortstopping agents of the present invention. Particularly in regard to increased porosity which is a most desirable property in PVC polymers.

The present invention has numerous advantages. For example, the shortstopping agents of the present invention are colorless, low toxicity materials which alleviates much of the color problems in the finished resin or polymer. Further, the use of the shortstopping agents, herein described, in the polymerization systems does not lead to formation of toxic or hazardous by-products or other products necessitating their removal from the polymer or recovered monomers. In the event of a power failure during production of the polymer, the shortstopping agent can be added immediately to slow down and terminate the polymerization thus eliminating possible "run-away" reactions along with potentially hazardous results. Other advantages will be apparent to those skilled in the art.

While the present invention has been described in terms of its specific embodiments, certain modifications and equivalents will be apparent to those skilled in the art and are intended to be included within the scope of the invention, which is to be limited only by the reasonable scope of the appended claims.

I claim:

1. A method of stopping the homopolymerization of vinyl chloride and the copolymerization of vinyl chloride with one or more copolymerizable olefinic monomers having a terminal $CH_2\!=\!C<$ grouping in the presence of a free-radical yielding catalyst(s) comprising, adding to the polymerization mixture containing said monomer(s) and said catalyst(s) a shortstopping agent selected from the group consisting of 4,4'-thiodiphenol, the $NH_4$, Na, K and hi salts of 4,4'-thiodiphenol, acid and salt forms of mixtures of the 4,4'-, 2,2'-, and 2,4'-thiodiphenol isomers, and the monoethanolamine salt of 4,4'-thiodiphenol, said shortstopping agent being employed in an amount greater than ½ the amount of the catalyst(s) charged to the reactor, maintaining the pH of the reaction medium above 7.0, and activating said shortstopping agent by lowering the pH to about 2.0 to about 5.0.

2. The method as defined in claim 1 wherein the monomer is vinyl chloride.

3. The method as defined in claim 1 wherein the shortstopping agent is added to said mixture as an alcohol solution containing from about 1% to about 30% by weight of 4,4'-thiodiphenol.

4. The method as defined in claim 1 wherein the shortstopping agent is added to said mixture as an aqueous solution containing from about 1% to about 30% by weight of the monoethanolamine salt of 4,4'-thiodiphenol.

5. The method as defined in claim 1 wherein the polymerization mixture contains from about 0.01% to about 1.0% of a dispersant.

6. The method as defined in claim 5 wherein the dispersant is polyvinyl alcohol.

7. The method as defined in claim 3 wherein the monomer is vinyl chloride.

8. The method as defined in claim 4 wherein the monomer is vinyl chloride.

9. The method as defined in claim 1 wherein the monomers are vinyl chloride and vinyl acetate.

10. The method as defined in claim 3 wherein the polymerization mixture contains from about 0.01% to about 1.0% of a dispersant.

11. The method as defined in claim 10 wherein the dispersant is polyvinyl alcohol.

* * * * *

UNITED STATES PATENT AND TRADEMARK OFFICE
CERTIFICATE OF CORRECTION

PATENT NO. : 4,346,202
DATED : August 24, 1982
INVENTOR(S) : Louis Cohen

It is certified that error appears in the above-identified patent and that said Letters Patent are hereby corrected as shown below:

Column 1 - line 40 "shortstepping" should read --shortstopping--;

Table I, fourth column, second line "3.5" should read --35--

Signed and Sealed this

Nineteenth Day of October 1982

[SEAL]

Attest:

Attesting Officer

GERALD J. MOSSINGHOFF
Commissioner of Patents and Trademarks